US012613365B2

(12) United States Patent
Divliansky et al.

(10) Patent No.: US 12,613,365 B2
(45) Date of Patent: Apr. 28, 2026

(54) SYSTEMS AND METHODS USING A PAIR OF ROTATED VOLUME BRAGG GRATINGS FOR SPECTRAL PHASE MODULATION

(71) Applicant: University of Central Florida Research Foundation, Inc., Orlando, FL (US)

(72) Inventors: Ivan Divliansky, Orlando, FL (US); Ayman Abouraddy, Orlando, FL (US); Leonid Glebov, Orlando, FL (US); Oussama Mhibik, Oviedo, FL (US); Murat Yessenov, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 326 days.

(21) Appl. No.: 18/532,922

(22) Filed: Dec. 7, 2023

(65) Prior Publication Data

US 2024/0192412 A1     Jun. 13, 2024

Related U.S. Application Data

(60) Provisional application No. 63/430,805, filed on Dec. 7, 2022.

(51) Int. Cl.
*G02B 5/18*          (2006.01)
(52) U.S. Cl.
CPC ................................. *G02B 5/1861* (2013.01)
(58) Field of Classification Search
CPC .................................................. G02B 5/1861
See application file for complete search history.

(56) References Cited

U.S. PATENT DOCUMENTS

| 6,181,427 B1 | 1/2001 | Yarussi et al. |
| 2005/0105084 A1 | 5/2005 | Wang et al. |
| | (Continued) | |

FOREIGN PATENT DOCUMENTS

| CN | 108459367 A | 8/2018 |

OTHER PUBLICATIONS

Bandyopadhyay et al., "Highly efficient free-space fiber coupler with 45 tilted fiber grating to access remotely placed optical fiber sensors," Optics Express, vol. 28, No. 11, May 25, 2020, 10 pages.
(Continued)

*Primary Examiner* — Charles S Chang
(74) *Attorney, Agent, or Firm* — Suiter Swantz IP

(57)          ABSTRACT

A phase modulation device may include two rotated chirped volume Bragg gratings (r-VBGs), where the two r-VBGs are spatially separated along a separation direction oriented at a nonzero degree angle to the grating vectors, and further includes a phase modulator between the two r-VBGs with a spatially non-uniform phase distribution in a plane orthogonal to the separation direction. A first of the two r-VBGs may reflect portions of an input beam propagating towards the phase modulator as spectrally-spread beam. A second of the two r-VBGs may reflect portions of the spectrally-spread beam satisfying the Bragg condition into the incidence direction, where the second r-VBG is positioned to provide that the Bragg condition is satisfied for different wavelengths at different locations of the first r-VBG along the incidence direction to provide that the spectrally-spread beam is spectrally recombined into an output beam.

26 Claims, 13 Drawing Sheets

(56) References Cited

U.S. PATENT DOCUMENTS

| | | | |
|---|---|---|---|
| 2006/0221449 A1 | 10/2006 | Glebov et al. | |
| 2007/0153862 A1* | 7/2007 | Shchegrov | H01S 5/141 |
| | | | 348/E9.026 |
| 2011/0206070 A1 | 8/2011 | Karavitis | |
| 2014/0268314 A1 | 9/2014 | Dueck | |
| 2014/0348200 A1 | 11/2014 | Arumugam et al. | |
| 2015/0378080 A1 | 12/2015 | Georgiou et al. | |
| 2016/0116656 A1 | 4/2016 | Glebov et al. | |
| 2017/0131546 A1 | 5/2017 | Woltman et al. | |
| 2017/0131551 A1 | 5/2017 | Robbins et al. | |
| 2020/0371387 A1 | 11/2020 | Gollier et al. | |
| 2020/0387043 A1 | 12/2020 | Blanche | |
| 2021/0354129 A1 | 11/2021 | Meng et al. | |
| 2021/0367391 A1 | 11/2021 | Bernier et al. | |
| 2022/0034791 A1 | 2/2022 | Zhang | |
| 2022/0137411 A1 | 5/2022 | Lam et al. | |
| 2022/0283376 A1 | 9/2022 | Waldern et al. | |
| 2022/0283540 A1 | 9/2022 | Trepanier et al. | |
| 2022/0299868 A1 | 9/2022 | Lane et al. | |
| 2022/0365482 A1 | 11/2022 | Yu et al. | |

OTHER PUBLICATIONS

Bharathan et al., "In-fiber polarizer based on a 45-degree tilted fluoride fiber Bragg grating for mid-infrared fiber laser technology," OSA Continuum vol. 1, No. 1, Sep. 15, 2018, 8 pages.

Ciapurin et al., "Modeling of phase volume diffractive gratings, part 1: transmitting sinusoidal uniform gratings," Optical Engineering 45, 015802, Jan. 2006, 10 pages.

Ciapurin et al., "Modeling of phase volume diffractive gratings, part 2: reflecting sinusoidal uniform gratings, Bragg mirrors," Optical Engineering 51, 058001, May 2012, 11 pages.

International Search Report and Written Opinion received in International Application No. PCT/US2023/082985, Mar. 7, 2024, 9 pages.

International Search Report and Written Opinion received in International Application No. PCT/US2023/082987, Mar. 19, 2024, 10 pages.

International Search Report and Written Opinion received in International Application No. PCT/US2023/082995, Mar. 13, 2024, 8 pages.

International Search Report and Written Opinion received in International Application No. PCT/US2023/082997, May 2, 2024, 7 pages.

Mhibik et al., "Compact dual-band spectral analysis via multiplexed rotated chirped volume Bragg gratings," Optics Letters, The College of Optics & Photonics, University of Central Florida, Sep. 5, 2023, 5 pages.

Mhibik et al., "Rotated chirped volume Bragg gratings for compact spectral analysis," Optics Letters, vol. 48, No. 5, The College of Optics and Photonics, University of Central Florida, March 1, 2023, 4 pages.

Yessenov et al., "Ultra-compact synthesis of space-time wave packets," Optics Letters, vol. 48, No. 10, The College of Optics & Photonics, University of Central Florida, Department of Electrical and Computer Engineering, University of Utah, May 15, 2023, 4 pages.

Glebov, A.L., Mokhun, O., Rapaport, A., Vergnole, S., Smirnov, V. and Glebov, L.B., 2012, May. Volume Bragg 1 gratings as ultra-narrow and multiband optical filters. In Micro-Optics 2012 (vol. 8428, pp. 42-52). SPIE. (Year: 2012).

* cited by examiner

500

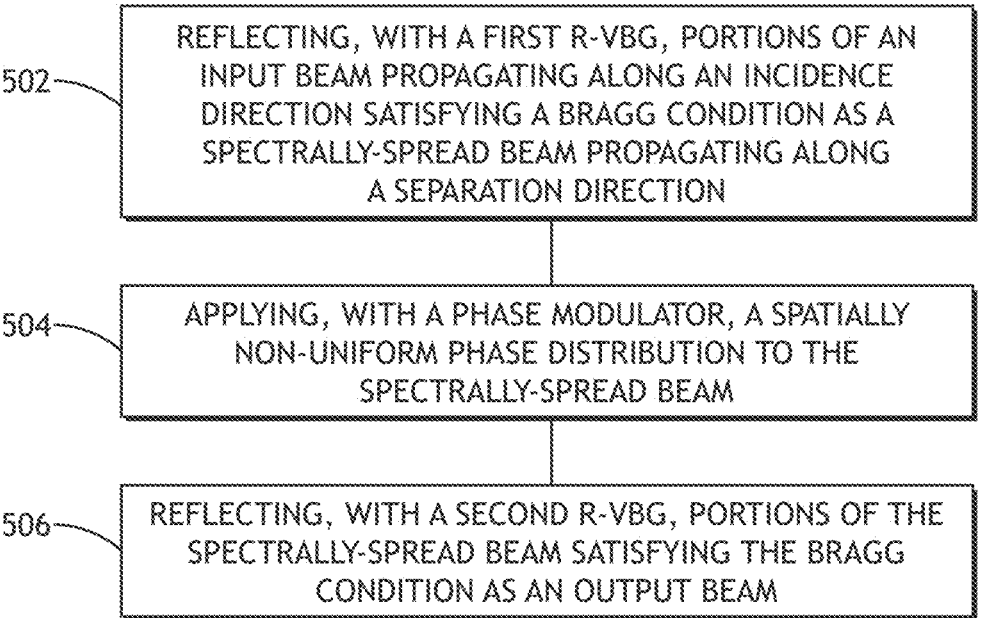

502 — REFLECTING, WITH A FIRST R-VBG, PORTIONS OF AN INPUT BEAM PROPAGATING ALONG AN INCIDENCE DIRECTION SATISFYING A BRAGG CONDITION AS A SPECTRALLY-SPREAD BEAM PROPAGATING ALONG A SEPARATION DIRECTION

504 — APPLYING, WITH A PHASE MODULATOR, A SPATIALLY NON-UNIFORM PHASE DISTRIBUTION TO THE SPECTRALLY-SPREAD BEAM

506 — REFLECTING, WITH A SECOND R-VBG, PORTIONS OF THE SPECTRALLY-SPREAD BEAM SATISFYING THE BRAGG CONDITION AS AN OUTPUT BEAM

FIG.5

SYSTEMS AND METHODS USING A PAIR OF ROTATED VOLUME BRAGG GRATINGS FOR SPECTRAL PHASE MODULATION

CROSS-REFERENCE TO RELATED APPLICATION

The present application claims the benefit under 35 U.S.C. § 119(e) of U.S. Provisional Application Ser. No. 63/430,805, filed Dec. 7, 2022, which is incorporated herein by reference in the entirety.

TECHNICAL FIELD

The present disclosure relates generally to spectral phase modulation of light and, more particularly, to spectral phase modulation using rotated volume Bragg gratings.

BACKGROUND

It is often highly desirable to miniaturize optical components to provide compact and robust implementation. However, in many cases, miniaturization of optical components does not eliminate free-space propagation requirements and thus provides only limited impact. For example, replacing a conventional lens with an ultrathin metasurface may reduce the physical size of the lens, but does not substantially reduce the free-space propagation length required for image formation. As another example, traditional techniques providing spectral phase modulation utilize a combination of dispersive optics and lenses that requires free-space propagation. As a result, attempts to miniaturize such components provides limited impact on overall device size. There is therefore a need to develop systems and methods to address the above deficiencies.

SUMMARY

A phase modulation device is disclosed, in accordance with one or more illustrative embodiments of the present disclosure. In embodiments, the device includes two rotated chirped volume Bragg gratings (r-VBGs) formed as planes of refractive index variation with periodicity along parallel grating vectors, where the periods of the two r-VBGs are chirped along the respective grating vectors to vary along the respective grating vectors, where the two r-VBGs are spatially separated along a separation direction oriented at a nonzero angle to the grating vectors. In embodiments, the device includes a phase modulator between the two r-VBGs with a spatially non-uniform phase distribution in a plane orthogonal to the separation direction. In embodiments, a first of the two r-VBGs is configured to reflect portions of an input beam propagating along an incidence direction satisfying a Bragg condition into the separation direction towards the phase modulator as spectrally-spread beam, where the Bragg condition is satisfied for different wavelengths at different locations of the first r-VBG along the incidence direction to provide that a spectrum of the spectrally-spread beam is dispersed along the incidence direction. In embodiments, a second of the two r-VBGs is configured to reflect portions of the spectrally-spread beam satisfying the Bragg condition into the incidence direction, where the second r-VBG is positioned to provide that the Bragg condition is satisfied for different wavelengths at different locations of the first r-VBG along the incidence direction to provide that the spectrally-spread beam is spectrally recombined into an output beam.

In embodiments, the non-zero angle is 45 degrees.

In embodiments, the first r-VBG is formed in a first material, where the second r-VBG is formed in a second material, where the phase modulator is located between the first and second r-VBGs without intervening components.

In embodiments, the phase modulator is in physical contact with at least one of the first or second r-VBGs.

In embodiments, the two r-VBGs and the phase modulator are formed in a single material.

In embodiments, the phase modulator is a two-dimensional phase modulator. In embodiments, the phase modulator is a one-dimensional phase modulator.

In embodiments, the spatially non-uniform phase distribution of the phase modulator is selected to transform the input beam into a space-time wave packet (STWP).

In embodiments, the output beam has a frequency-dependent propagation angle $\phi(\omega)$ such that an axial wavenumber $k_z$ and temporal frequency $\omega$ are related by a linear relationship $\Omega=(k_z-k_0)c\cdot\tan\theta$ in free space, where $\Omega=\omega-\omega_0$, $\omega_0$ is a fixed frequency associated with on-axis propagation, c is the speed of light in vacuum, $k_0=\omega_0/c$, $\theta$ is spectral angle, and z is the incidence direction. In embodiments, the output beam has a frequency-dependent propagation angle such that an axial wavenumber $k_z$ and temporal frequency $\omega$ are related by a non-linear relationship in free space. In embodiments, the non-linear relationship in free space comprises at least one of a quadratic, cubic, or polynomial relationship. In embodiments, the output beam has a frequency-dependent propagation angle $\phi(\omega)$, where at least one such that at least one axial wavenumber $k_z$ is correlated with multiple frequencies w.

In embodiments, the input light is a laser pulse, where the spatially non-uniform phase distribution of the phase modulator is selected to apply negative chirp to the laser pulse.

A method is disclosed, in accordance with one or more illustrative embodiments of the present disclosure. In embodiments, the method includes reflecting, with a first rotated volume Bragg grating (r-VBG), portions of an input beam propagating along an incidence direction satisfying a Bragg condition as a spectrally-spread beam propagating along a separation direction, where the Bragg condition is satisfied for different wavelengths at different locations of the first r-VBG along the incidence direction to provide that a spectrum of the spectrally-spread beam is dispersed along the incidence direction.

In embodiments, the method includes applying, with a phase modulator, a spatially non-uniform phase distribution to the spectrally-spread beam. In embodiments, the method includes reflecting, with a second r-VBG, portions of the spectrally-spread beam satisfying the Bragg condition as an output beam, where the second r-VBG is positioned to provide that the Bragg condition is satisfied for different wavelengths at different locations of the first r-VBG along the incidence direction to provide that the spectrally-spread beam is spectrally recombined into an output beam propagating along the incidence direction. In embodiments, the first and second r-VBGs are formed as planes of refractive index variation with periodicity along parallel grating vectors, where the periods of the two r-VBGs are chirped along the respective grating vectors to vary along the respective grating vectors, where the two r-VBGs are spatially separated along the separation direction oriented at a nonzero angle to the grating vectors.

In embodiments, the non-zero angle is 45 degrees.

In embodiments, the first r-VBG is formed in a first material, where the second r-VBG is formed in a second material, where the phase modulator is located between the first and second r-VBGs without intervening components.

In embodiments, the phase modulator is in physical contact with at least one of the first or second r-VBGs. In embodiments, the two r-VBGs and the phase modulator are formed in a single material.

In embodiments, the phase modulator is a two-dimensional phase modulator. In embodiments, the phase modulator is a one-dimensional phase modulator.

In embodiments, the spatially non-uniform phase distribution of the phase modulator is selected to transform the input beam into a space-time wave packet (STWP). In embodiments, the output beam has a frequency-dependent propagation angle $\phi(\omega)$ such that an axial wavenumber $k_z$ and temporal frequency $\omega$ are related by a linear relationship $\Omega=(k_z-k_0)c\cdot\tan\theta$ in free space, where $\Omega=\omega-\omega_0$, $\omega_0$ is a fixed frequency associated with on-axis propagation, c is the speed of light in vacuum, $k_0=\omega_0/c$, $\theta$ is spectral angle, and z is the incidence direction. In embodiments, the output beam has a frequency-dependent propagation angle such that an axial wavenumber $k_z$ and temporal frequency $\omega$ are related by a non-linear relationship in free space. In embodiments, the non-linear relationship in free space comprises at least one of a quadratic, cubic, or polynomial relationship.

In embodiments, the output beam has a frequency-dependent propagation angle $\phi(\omega)$, where at least one such that at least one axial wavenumber $k_z$ is correlated with multiple frequencies $\omega$.

In embodiments, the input light is a laser pulse, where the spatially non-uniform phase distribution of the phase modulator is selected to apply negative chirp to the laser pulse.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures.

FIG. 5 is a flow diagram illustrating steps performed in a method for spectral phase modulation using a pair of chirped r-VBGs, in accordance with one or more embodiments of the present disclosure.

DETAILED DESCRIPTION

Figure 1A:
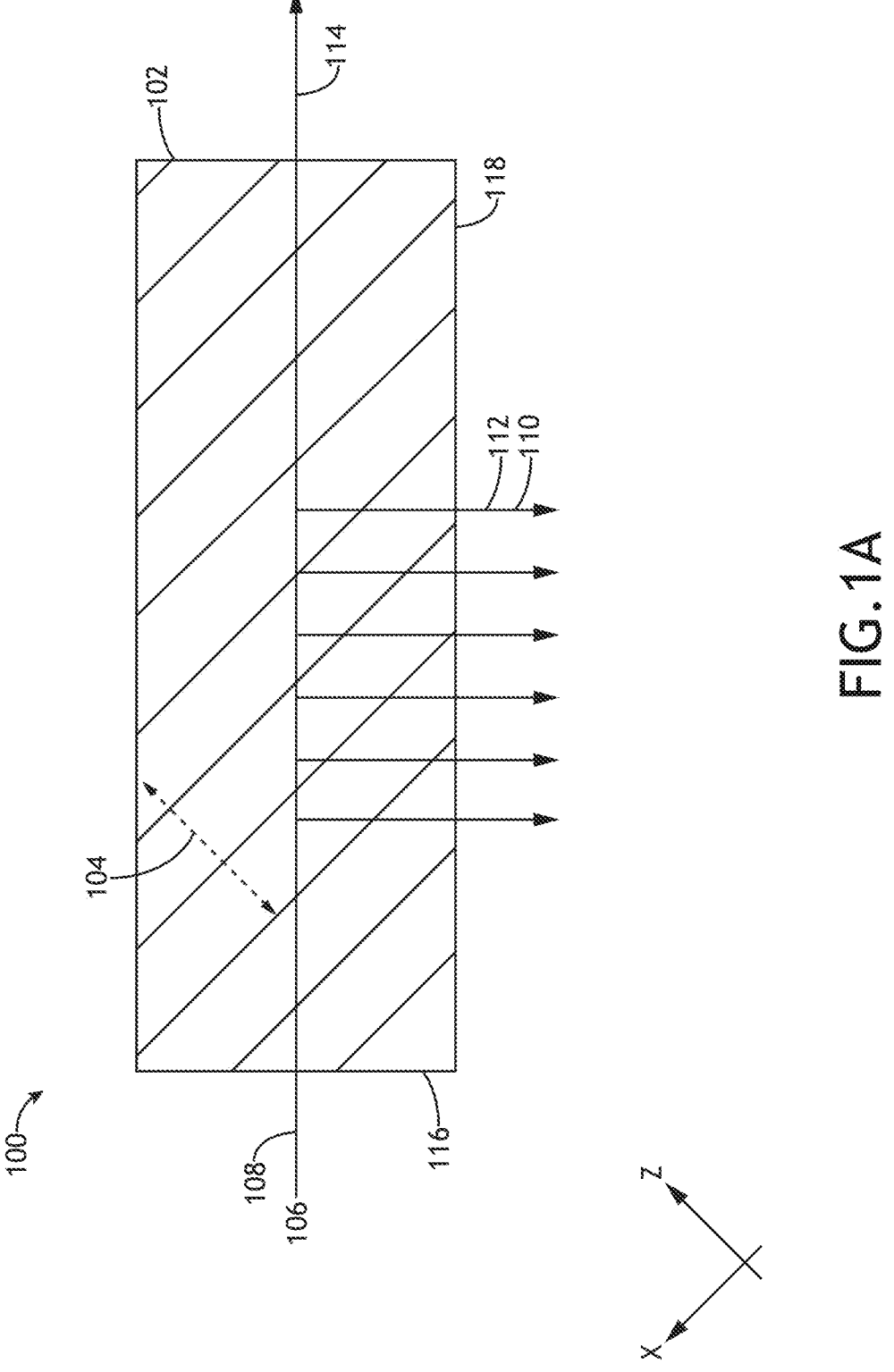
FIG. 1A is a top view of a rotated volume Bragg grating (r-VBG) with a uniform period, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to systems and methods for spectral phase modulation using one or more rotated volume Bragg gratings (r-VBGs).

As used herein an r-VBG is formed as a VBG having a grating vector direction of the rotated relative to an input face of a material or an expected direction of incident light. VBGs are generally described in Igor V. Ciapurin, et al., "Modeling of phase volume diffractive gratings, part 1: transmitting sinusoidal uniform gratings," Optical Engineering 45 (2006) 015802, 1-9; and Igor V. Ciapurin, et al., "Modeling of phase volume diffractive gratings, part 2: reflecting sinusoidal uniform gratings, Bragg mirrors," Optical Engineering 51 (2012) 058001, 1-10, both of which are incorporated herein by reference in their entireties. Further, transmissive VBGs (e.g., VBGs for which light satisfying a Bragg condition is diffracted as a transmitted beam) configured as transmissive phase masks are described generally in U.S. Patent Publication No. 2016/0116656 published on Apr. 28, 2016, which is incorporated herein by reference in its entirety.

In embodiments, a phase modulator is placed between a pair of complementary chirped r-VBGs to provide compact, efficient, and robust spectral phase modulation. In this configuration, a first r-VBG has a grating vector direction oriented at a non-zero angle relative to an incidence direction of input light. It is contemplated herein that such a configuration may spatially resolve the spectrum of the input light in a highly compact package. In particular, such a configuration provides that a Bragg condition for reflection may be satisfied for different wavelengths at different depths of the chirped r-VBG.

A phase modulator placed after the first r-VBG may then introduce any one-dimensional or two-dimensional phase distribution to the spectrally-resolved input light.

A second r-VBG may then receive the light from the phase modulator and recombine the spectral components to provide a beam having a beam profile that is substantially similar to the input light.

Notably, the resolution at which the spectrum of incident light is spatially spread or combined by an r-VBG depends on the particular distribution of the refractive index variation of the r-VBG along the propagation direction. As a result, such a device has no requirement for free-space propagation of the spectral components between the first and second r-VBGs and may thus provide an extraordinarily compact solution for applying tailored phase modulations to different spectral components of the input light.

It is contemplated herein that a spectral phase modulator as disclosed herein may be used to introduce any selected one-dimensional or two-dimensional phase profile to the spectrally-spread spectrum of input light. As a result, a spectral phase modulator as disclosed herein may be suitable for generating any type of output beam. In some embodiments, a spectral phase modulator is configured to generate a space-time wave packet (STWP) such as, but not limited to, a light sheet. In some embodiments, a spectral phase modulator is configured to provide spectral phase modification of ultrashort pulses. For example, the spectral components of ultrashort-pulse input light may be adjusted (e.g., pre-chirped) to provide that a pulse width of the output beam is minimized after propagating a selected distance in a selected material.

Referring now to FIGS. 1A-5, systems and methods for phase modulation with at least one r-VBG 100 are described in greater detail, in accordance with one or more embodiments of the present disclosure.

A VBG may be formed as a grating structure associated within the volume of material 102 with a periodic variation of refractive index along a grating vector direction $$104 \, k = \frac{2\pi}{d}.$$

The material may include a photosensitive material or any other suitable material. This grating structure is typically extended in directions perpendicular to the grating vector direction 104. Put another way, a VBG may typically have a constant refractive index within any plane normal to the grating vector direction 104, where the refractive index along the grating vector direction 104 varies periodically. Further, a VBG may generally have any selected variation of the refractive index along the grating vector direction 104 so long as a Bragg condition is satisfied for at least one wavelength in at least a portion of the VBG. For example, the refractive index n of a traditional VBG may be a simple sinusoidal function with a constant (e.g., uniform) period along the grating vector direction 104. As another example, the refractive index n of a chirped VBG may have a variable period along the grating vector direction 104 and may thus satisfy a Bragg condition for different wavelengths at different locations. As another example, the refractive index variation (δn) of an apodized VBG may vary along the grating vector direction 104.

An r-VBG 100 may then be formed as a VBG with a grating vector direction 104 oriented at an angle from an expected incidence direction 106 of input light 108 (e.g., an input beam) or at an angle with respect to an input face 116 of the material in which the VBG is formed. Similarly, an r-VBG 100 may generally have any refractive index distribution along the grating vector direction 104 that satisfies a Bragg condition for light of at least one wavelength incident along the incidence direction 106.

Figure 1B:
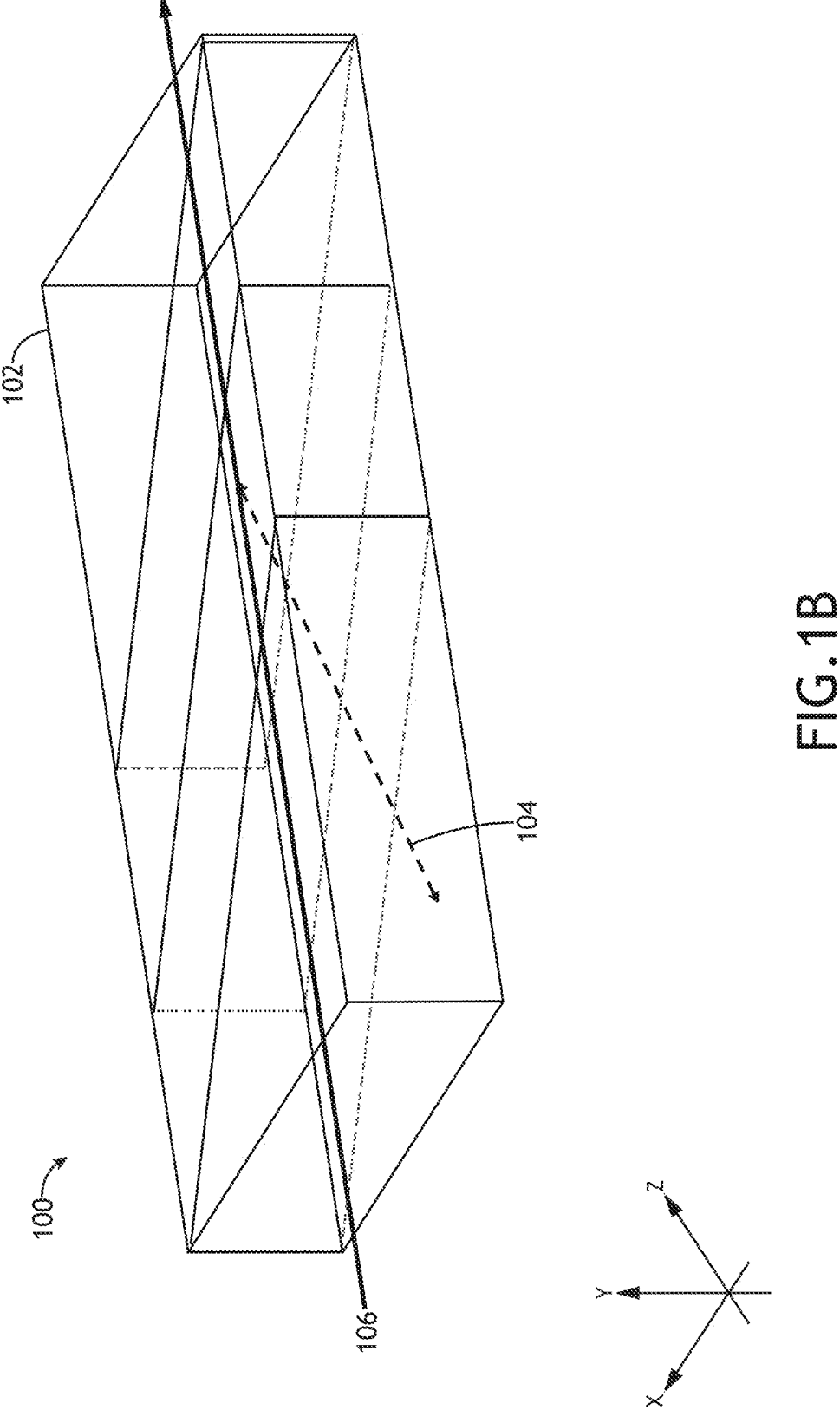
FIG. 1B is a perspective view of the r-VBG of FIG. 1A, in accordance with one or more embodiments of the present disclosure.

FIG. 1A is a top view of an r-VBG 100 with a uniform period, in accordance with one or more embodiments of the present disclosure. FIG. 1B is a perspective view of the r-VBG 100 of FIG. 1A, in accordance with one or more embodiments of the present disclosure.

In FIGS. 1A and 1B, the grating vector direction 104 corresponds to a Z axis. The refractive index variation of the r-VBG 100 depicted in FIGS. 1A and 1B may then be characterized as:

$$n(z) = n_0 + \delta n \cos\left(\frac{2\pi}{\Lambda_0} \cdot z\right) \tag{1}$$

where $n_0$ is an average refractive index of a material 102 in which the r-VBG 100 is formed, δn is a refractive index contrast, and $\Lambda_0$ is a period of the refractive index variation along the grating vector direction 104. Further, the refractive index at any particular value of z may be constant along a corresponding plane orthogonal to the grating vector direction 104 (e.g., an X-Y plane). It is noted that the figures depict variations of refractive index along the grating vector direction 104 as simple lines, but this is merely illustrative and should not be interpreted as limiting the scope of the present disclosure. It is to be understood that Equation (2) is merely illustrative and not limiting on the scope of the present disclosure. Rather, an r-VBG 100 may include any refractive index distribution suitable for reflecting light via Bragg reflection. For example, as will be described in greater detail below, the period of the refractive index variation ($\Lambda_0$) may vary along the grating vector direction 104 (e.g., forming a chirped r-VBG 100). As another example, the refractive index contrast (δn) may also vary along the grating vector direction 104, which is referred to herein as apodization such that an r-VBG 100 with a refractive index contrast (δn) that varies along the grating vector direction 104 is an apodized r-VBG 100. In this configuration, the diffraction efficiency may also vary along the grating vector direction 104.

An r-VBG 100 may reflect light via Bragg diffraction when a Bragg condition is satisfied for a particular wavelength and incidence direction 106 and transmit light otherwise. For example, FIGS. 1A and 1B depict input light 108 along an incidence direction 106, where a portion of the input light 108 is reflected via Bragg diffraction along a reflection direction 110 (e.g., as reflected light 112) and a portion of the input light 108 is transmitted along the input light 108 (e.g., as transmitted light 114). Notably, the incidence direction 106 and the reflection direction 110 lie within a diffraction plane (e.g., a plane of diffraction) formed by the grating vector direction 104 and the incidence direction 106. In FIGS. 1A and 1B, the diffraction plane corresponds to the X-Z plane. Notably, reflected light 112 and transmitted light 114 also lie within the diffraction plane.

The reflected light 112 may be spatially extended (e.g., spatially chirped) along the incidence direction 106 as demonstrated in FIG. 1A. The extent of the spatial chirp along the incidence direction 106 may depend on various factors such as, but not limited to, a diffraction efficiency of Bragg diffraction that produces the reflected light 112. In this way, the depiction of six rays of reflected light 112 in FIG. 1A is merely illustrative and should not be interpreted as limiting the present disclosure. Further, the depiction of the location of the reflected light 112 along the incidence direction 106 is also merely illustrative and should not be interpreted as limiting the present disclosure. Some figures depict reflected light 112 as a single ray, but this is again for illustrative purposes and should not be interpreted as limiting the present disclosure.

The reflected wavelength (e.g., a wavelength at which a Bragg condition is satisfied) may be characterized by:

$$\lambda(\phi) = 2\Lambda_0\sqrt{n_0^2 - \sin^2\phi} \tag{2}$$

where $\phi$ is an angle between the grating vector direction 104 and an incidence direction 106. Equation (2) illustrates that the reflected wavelength decreases as the angle $\phi$ increases between 0 and 45 degrees. Further, for the particular case of $\phi = 45°$, the reflected wavelength is $\lambda(45°) = \sqrt{2}\Lambda_0 n_0$.

It is contemplated herein that the material 102 in which an r-VBG 100 is formed may have any shape and/or any number of faces at any orientation with respect to the grating vector direction 104. In some embodiments, an r-VBG 100 and one or more faces of the material 102 are co-designed to provide that light propagates normally through one or more faces. Such a configuration may be useful for, but not limited to, mitigating dispersion at the face. For example, as depicted in FIG. 1A, the grating vector direction 104 may be oriented at a non-zero angle with respect to a normal of an input face 116, which may be suitable for, but not limited to, applications in which input light 108 is expected to propagate through the input face 116 at normal incidence. As another example, as also depicted in FIG. 1A, an output face 118 may be oriented such that reflected light 112 (e.g., of a known wavelength based on a known incidence direction 106) exits the material 102 through the output face 118 at normal incidence.

Figure 1C:
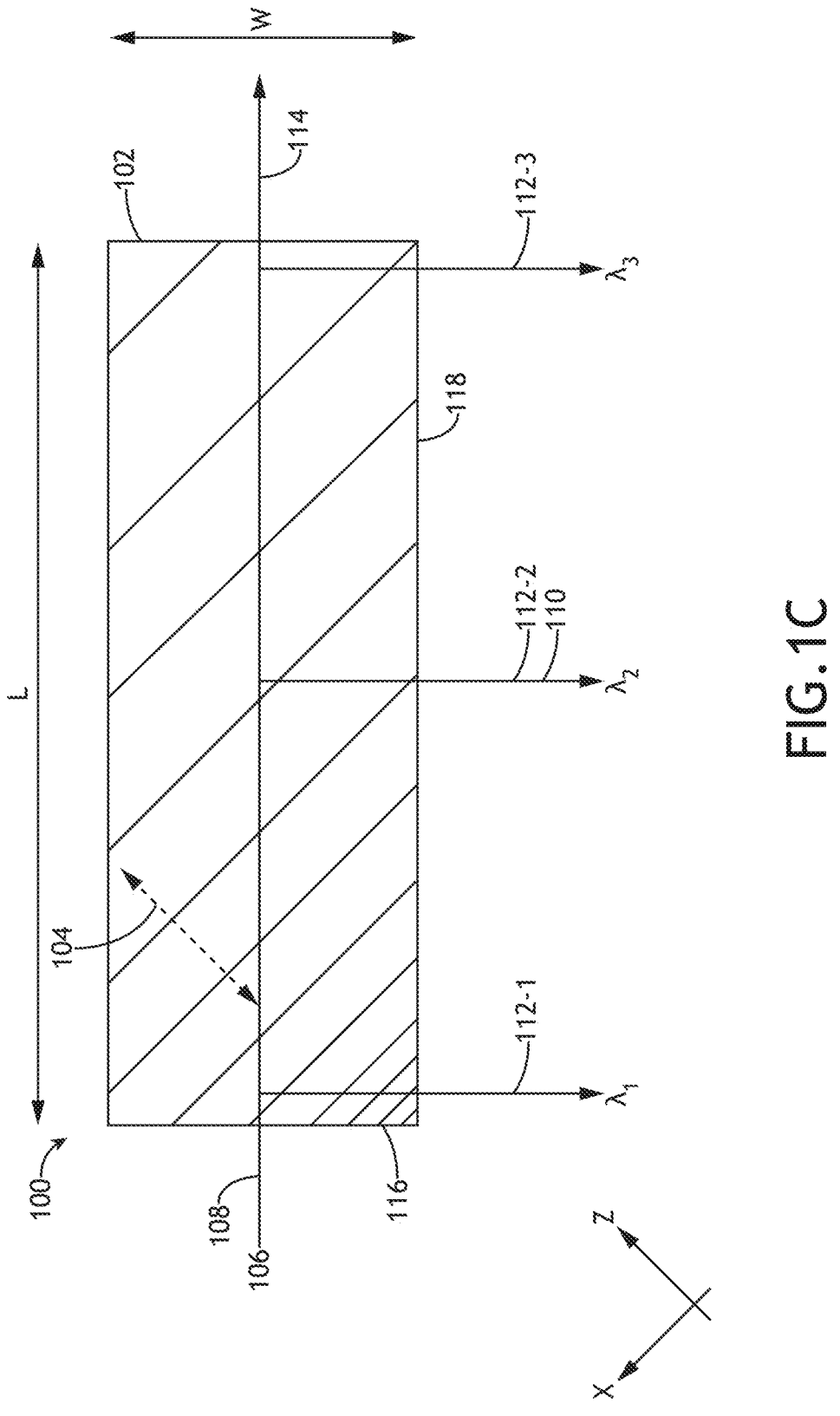
FIG. 1C is a top view of an r-VBG with linear chirp along the grating vector direction, in accordance with one or more embodiments of the present disclosure.

Referring now to FIG. 1C, the properties of an r-VBG 100 with a non-uniform refractive index distribution along the grating vector direction 104 (e.g., a chirped distribution) is described.

As indicated previously herein, an r-VBG 100 may generally have any refractive index distribution along the grating vector direction 104 that satisfies a Bragg condition for light of at least one wavelength propagating along an incidence direction 106 that is different than the grating vector direction 104. In some embodiments, a period of the refractive index variation varies monotonically along the grating vector direction 104 (e.g., monotonically increases or decreases). For example, the period may vary linearly, quadratically, or by any other distribution. An r-VBG 100 with a non-uniform refractive index variation along the grating vector direction 104 may be referred to as a rotated chirped Volume Bragg grating and may be abbreviated as r-CVBG or r-CBG.

FIG. 1C is a top view of an r-VBG 100 with linear chirp along the grating vector direction 104, in accordance with one or more embodiments of the present disclosure. For example, the refractive index variation of an r-VBG 100 with linear chirp may be characterized as:

$$n(z) = n_0 + \delta n \cos\{Qz + \beta(z - 0.5L)^2\} \text{ where } Q \approx \frac{4\pi}{\lambda_0}n_0, \tag{3}$$

where $$Q \approx \frac{4\pi}{\lambda_0}n_0,$$

$\beta$ is a chirp rate, and L is a length of the r-VBG 100 along the incidence direction 106.

In this configuration, different wavelengths are reflected by the r-VBG 100 at different depths along the incidence direction 106. Put another way, the Bragg condition may be satisfied for different wavelengths at different depths along the incidence direction 106. This is illustrated in FIG. 1C by a first ray of reflected light 112-1 with a first wavelength $\lambda_1$ at a first depth along the incidence direction 106, a second ray of reflected light 112-2 with a second wavelength $\lambda_2$ at a second depth along the incidence direction 106, and a third ray of reflected light 112-3 with a third wavelength $\lambda_3$ at a third depth along the incidence direction 106. More particularly, it can be shown for the configuration of FIG. 1C that the reflected wavelength may be characterized as:

$$\lambda(z) = \lambda_0 - \gamma z, \tag{4}$$

$$\text{and } \gamma = \frac{\lambda_0^2}{2\pi n_0}\beta, \tag{5}$$

where $\lambda_0$ is a first reflected wavelength.

As a result, the reflected light 112 may be spectrally chirped (e.g., spectrally resolved) along the incidence direction 106 and also temporally chirped due to the difference in path lengths as a function of wavelength. A spectrally resolved bandwidth $\Delta\lambda$ (e.g., a resolution of the r-VBG 100) may be characterized as:

$$\Delta\lambda = \frac{n_0|\gamma|}{\sqrt{n_0^2 - \sin^2\phi}} \cdot L. \tag{6}$$

Accordingly, the resolved bandwidth may generally be increased by increasing the length of the r-VBG 100 along the incidence direction 106 (L). The primary constraint on the width W of the r-VBG 100 orthogonal to the incidence direction 106 is diffraction as it propagates along the incidence direction 106.

Figure 1D:
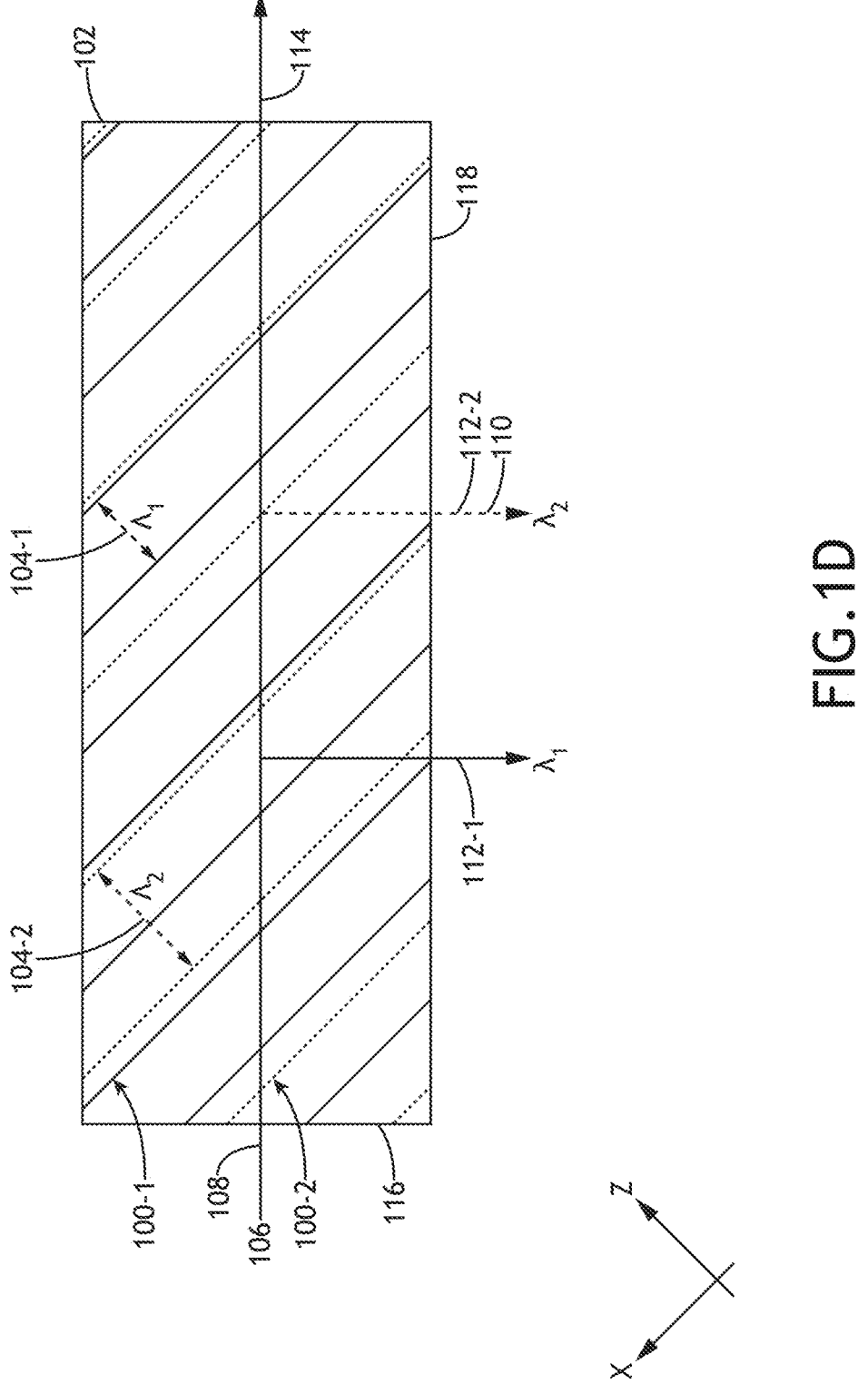
FIG. 1D is a top view of a material including two multiplexed chirped r-VBGs 100 with different grating vector directions, in accordance with one or more embodiments of the present disclosure.

Referring now to FIG. 1D, the fabrication of multiple r-VBGs 100 within a common volume of material 102 (e.g., multiplexed fabrication) is described in greater detail, in accordance with one or more embodiments of the present disclosure.

In a general sense, any number of r-VBGs 100 of any type (e.g., uniform, chirped, or the like) may be fabricated in a common volume of a material 102. Further, each r-VBG 100 may have a grating vector direction 104 along any selected direction. For example, multiple r-VBGs 100 may be fabricated within a common volume that have a common grating vector direction 104 but different refractive index distributions along the common grating vector direction 104 (e.g., different uniform periods, different chirp rates, or the like). Such a configuration may be suitable for, but not limited to, generating multiple beams of reflected light 112 out of a single output face. As another example, multiple r-VBGs 100 may be fabricated within a common volume that have different grating vector directions 104, where the r-VBGs 100 may have the same or different refractive index distributions along the respective grating vector directions 104. Such a configuration may be suitable for, but not limited to, generating multiple beams of reflected light 112 that propagate along different directions and potentially out of different output faces.

FIG. 1D is a top view of a material 102 including two multiplexed chirped r-VBGs 100 with different grating vector directions 104, in accordance with one or more embodiments of the present disclosure. In particular, FIG. 1D depicts a first r-VBG 100-1 with a first refractive index distribution along a first grating vector direction 104-1 and a second refractive index distribution along a second r-VBG 100-2 with second grating vector direction 104-2. In FIG. 1D, the first grating vector direction 104-1 is orthogonal to the second grating vector direction 104-2 and oriented at 45-degrees relative to the incidence direction 106. In this way, the first r-VBG 100-1 may generate first reflected light 112-1 through 112-3 having a first wavelength distribution (represented as $\lambda_1$ through $\lambda_3$) that exits through a first output face 118-1, whereas the second r-VBG 100-2 may generate second reflected light 112-4 through 112-6 having a second wavelength distribution (represented as $\lambda_4$ through $\lambda_6$) that exits through a second output face 118-2.

It is to be understood that the particular configuration depicted in FIG. 1D and the associated description are merely illustrative and should not be interpreted as limiting the scope of the present disclosure. In general, multiple r-VBGs 100 with different chirp distributions may have any grating vector directions 104 and may reflect light within any overlapping or non-overlapping spectral bands. Further, although not shown, uniform and chirped r-VBGs 100 may be multiplexed within a common volume.

Referring generally to FIGS. 1A-1F, additional aspects of r-VBGs 100 are now described in greater detail. An r-VBG 100 may be fabricated in any material 102 that has transparency for the wavelength or wavelengths of interest including, but not limited to, wavelengths in ultraviolet, visible, or infrared spectral regions. This includes but is not limited to glasses, crystals, polymers, sol-gels, and others. Further, an r-VBG 100 may be fabricated using any technique known in the art such as, but not limited to, holographic recording techniques or direct laser writing techniques (e.g., femtosecond laser direct writing techniques).

Figure 1E:
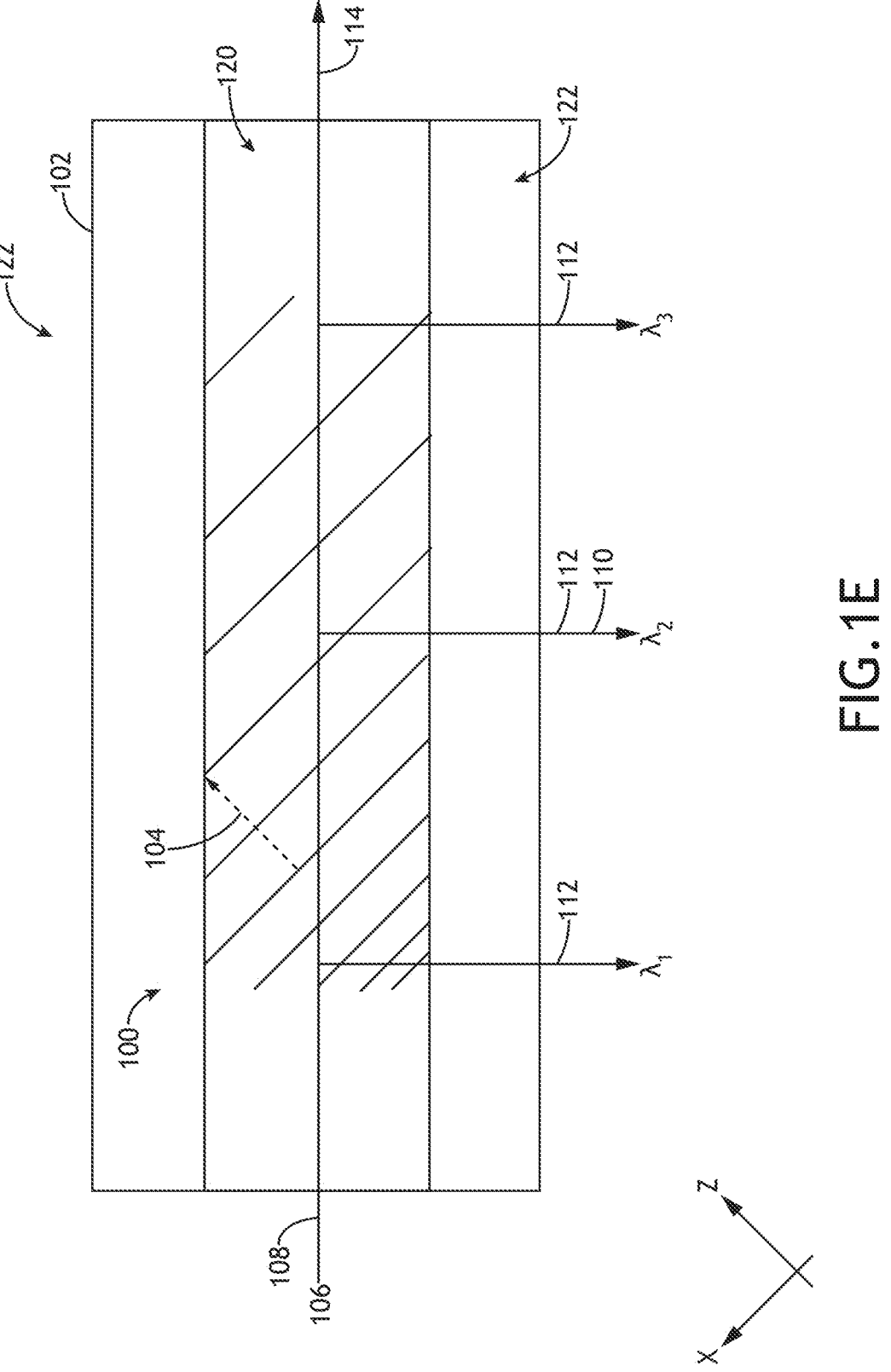
FIG. 1E is a simplified top view of an r-VBG 100 within a waveguide, in accordance with one or more embodiments of the present disclosure.

In some embodiments, an r-VBG 100 is fabricated within a waveguide 120. FIG. 1E is a simplified top view of an r-VBG 100 within a waveguide 120, in accordance with one or more embodiments of the present disclosure. In FIG. 1E, the material 102 in which an r-VBG 100 is formed operates as a waveguide 120 and is at least partially surrounded by cladding material 122 providing a refractive index differential suitable for guiding light.

The waveguide 120 and surrounding cladding material 122 may have any structure known in the art suitable for guiding light. Further, the waveguide 120 may be surrounded by any material or combination of materials having lower refractive index than the waveguide 120. In some embodiments, the waveguide 120 including the r-VBG 100 is fully surrounded by one or more cladding materials 122. Such a configuration may be, but is not required to be, characterized as an embedded waveguide. For example, the waveguide 120 including the r-VBG 100 may be buried within the volume of bulk material 102. As another example, the waveguide 120 including the r-VBG 100 may be fabricated on a substrate and/or film and be surrounded by a cap layer having the same or different composition as the substrate and/or film. As another example, the waveguide 120 including the r-VBG 100 may the core of an optical fiber. In some embodiments, the waveguide 120 including the r-VBG 100 is partially surrounded by cladding material 122. Such a configuration may be, but is not required to be, characterized as a rib waveguide or a ridge waveguide.

Figure 1F:
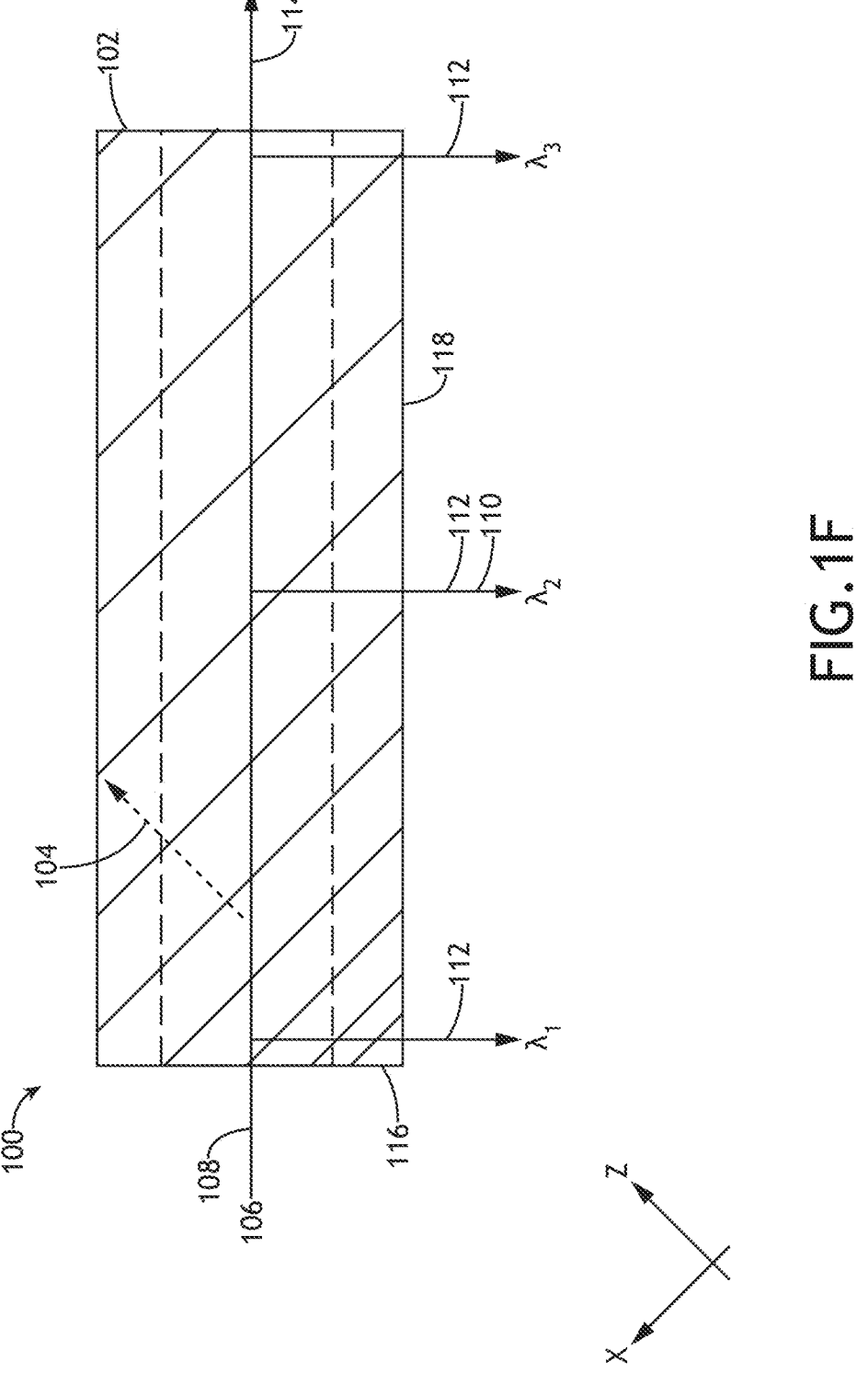
FIG. 1F is a simplified top view of a waveguide within an r-VBG, in accordance with one or more embodiments of the present disclosure.

In some embodiments, a waveguide 120 is fabricated within an r-VBG 100. FIG. 1F is a simplified top view of a waveguide 120 within an r-VBG 100, in accordance with one or more embodiments of the present disclosure. In this configuration, light may be guided as it propagates through the r-VBG 100 along the incidence direction 106.

Referring now to FIGS. 2A-5, systems and methods for phase modulation using one or more r-VBGs 100 is described in greater detail, in accordance with one or more embodiments of the present disclosure.

Figure 2A:
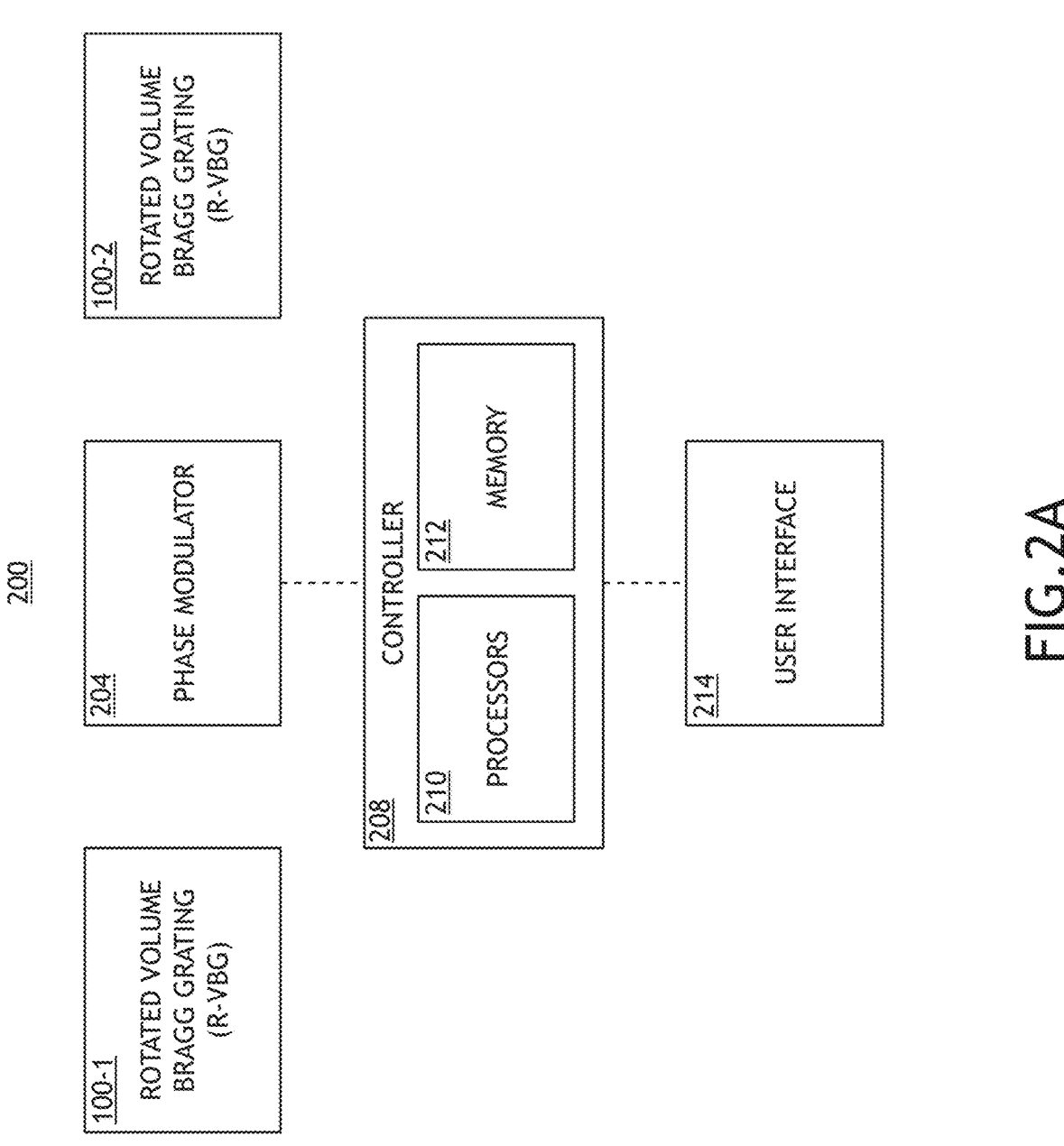
FIG. 2A is a block diagram of a spectral phase modulator, in accordance with one or more embodiments of the present disclosure.
Figure 2B:
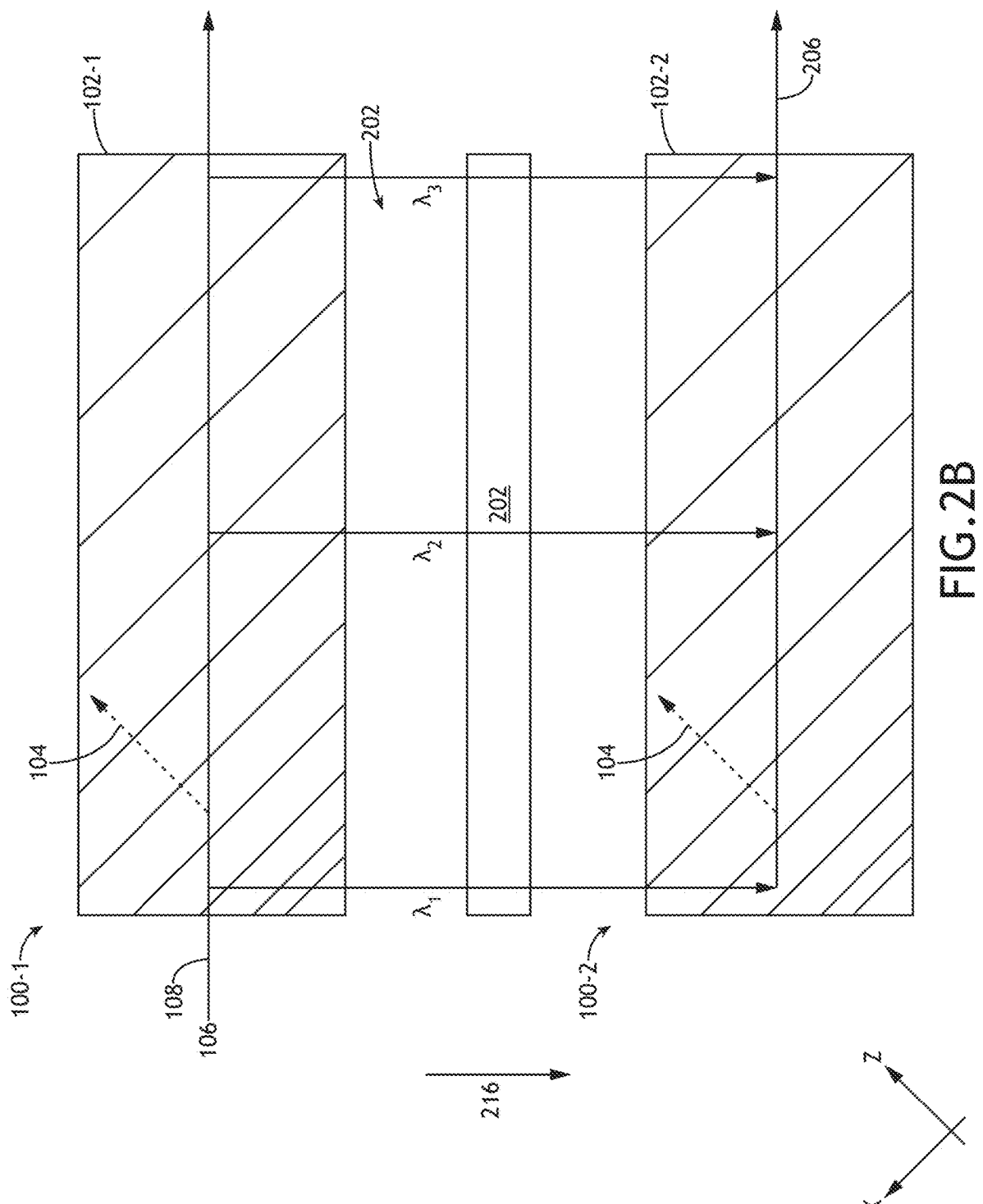
FIG. 2B is a simplified schematic of a spectral phase modulator, in accordance with one or more embodiments of the present disclosure.

FIG. 2A is a block diagram of a spectral phase modulator 200, in accordance with one or more embodiments of the present disclosure. FIG. 2B is a simplified schematic of a spectral phase modulator 200, in accordance with one or more embodiments of the present disclosure.

In some embodiments, a spectral phase modulator 200 includes a first chirped r-VBG 100-1 to spatially spread a spectrum of input light 108 as a spectrally-spread beam 202 propagating, a phase modulator 204 to apply any desired phase shifts to the spectrally-spread beam 202, and a second chirped r-VBG 100-2 to collect the spectrally-spread beam 202 from the phase modulator 204 and compress the spectrum of the spectrally-spread beam 202 to provide an output beam 206 having substantially the same beam profile as the input light 108. In some embodiments, the output beam 206 propagates along a direction parallel to the incidence direction 106 of the input light 108.

In some embodiments, the spectral phase modulator 200 further includes a controller 208 with one or more processors 210 configured to execute program instructions maintained on memory 212 (e.g., a memory medium). In some embodiments, the spectral phase modulator 200 includes a user interface 214, which may provide (e.g., display) data to a user and/or may receive input from a user.

Various aspects of the spectral phase modulator 200 will now be described in greater detail, in accordance with one or more embodiments of the present disclosure.

As described previously herein with respect to FIG. 1C, the first chirped r-VBG 100-1 may reflect light that satisfies a Bragg condition (e.g., as reflected light 112), where the Bragg condition is satisfied at different depths along the incidence direction 106 for different wavelengths. In the context of the spectral phase modulator 200, the spectrally-spread beam 202 refers to the reflected light 112 from the first r-VBG 100-1.

Further, the reflection direction 110 of the first r-VBG 100-1 is referred to as a separation direction 216 (e.g., describing a separation between the first r-VBG 100-1 and the second r-VBG 100-2).

As a result, a spatial distribution of the spectral components of the spectrally-spread beam 202 may be controlled by the distribution of the refractive index variation of the chirped r-VBG 100. Notably, while it may be convenient to describe the refractive index variation of a chirped r-VBG 100 along its grating vector direction 104 (e.g., as provided in Equation (3)), the spatial distribution of the spectral components of the spectrally-spread beam 202 may be more directly related to the refractive index variation along the incidence direction 106.

The second r-VBG 100-2 may then have the same distribution of refractive index variations as the first r-VBG 100-1 such that the second r-VBG 100-2 may reverse the spectral spreading provided by the first r-VBG 100-1. In this way, the first r-VBG 100-1 and the second r-VBG 100-2 may be characterized as a pair of r-VBGs 100.

In a general sense, a spectral phase modulator 200 may include any pair of chirped r-VBGs 100 (e.g., the first r-VBG 100-1 and the second r-VBG 100-2) having any refractive index distribution with a non-uniform period. In some embodiments, the refractive index distribution of a chirped r-VBG 100 in a spectral phase modulator 200 varies monotonically along the grating vector direction 104 (and thus monotonically along the incidence direction 106). For example, the refractive index distribution of a pair of chirped r-VBGs 100 in a spectral phase modulator 200 may vary linearly, quadratically, or with any other monotonic distribution along the grating vector direction 104.

As depicted in FIG. 2B, the spatial spread of the spectral components in the spectrally-spread beam 202 along the incidence direction 106 is based on the distribution of the period of the refractive index variation along the incidence direction 106, which has multiple benefits.

For example, the spectrally-spread beam 202 may be collimated or slowly diverging as it propagates along the separation direction 216 such that the spatial spread of the spectrum of the input light 108 does not change (or changes slowly) with distance from the chirped r-VBG 100. As a result, no free-space propagation, lenses, or other components are needed. Rather, the phase modulator 204 may be placed at any suitable position and may in some cases be in contact with the materials 102 in which the first r-VBG 100-1 and/or the second r-VBG 100-2 are formed. This configuration may thus be extraordinarily compact and may further be physically mounted in a package that is robust to vibrations or other mechanical movements.

As another example, the resolved bandwidth (e.g., a range of wavelengths $\Delta\lambda$ that may be captured) may be controlled by the length of the first chirped r-VBG 100-1 along the incidence direction 106 the rate of change of the period of refractive index variation (e.g., the chirp rate $\beta$ in Equation (3)). Further, the spectral resolution (e.g., a minimum wavelength separation $\delta\lambda$ that may be discerned) may be controlled by these parameters as well as a width of the input light 108 in a plane normal to the incidence direction 106, where decreasing the beam width may increase the spectral resolution. As a result, the use of a pair of chirped r-VBGs 100 to spread and then compress the spectrum of the input light 108 may provide substantial flexibility to balance the resolved bandwidth, the spectral resolution, and the overall size of the spectral phase modulator 200.

It is further contemplated herein that the pixels of a phase modulator 204 may provide spatial sampling of the spatially spread spectrum of the input light 108 when applying a phase modulation. In some embodiments, the pair of chirped r-VBGs 100 provide a linearly varying period of refractive index variation. Such a configuration may beneficially provide a spectrally-spread beam 202 with linearly varying wavelength along the incidence direction 106 and may further provide linear sampling of the spectrum by the phase modulator 204 when applying phase modulation to different portions of the spectrally-spread beam 202. However, this is not a requirement and some applications may benefit from non-linear sampling of a spectrum of the spectrally-spread beam 202, which may be achieved through non-linear variations of periods of a chirped pair of r-VBGs 100 along the respective grating vector directions 104 (and thus along the incidence direction 106).

The phase modulator 204 may include component or combination of components suitable for providing a spatially-varying phase modulation to the spectrally-spread beam 202. For example, the phase modulator 204 may include, but is not limited to, a spatial light modulator (SLM).

The phase modulator 204 may further provide any desired phase modulation profile in one or two dimensions (e.g., as considered in an plane normal to the spectrally-spread beam 202). For example, the phase modulation profile may be spatially non-uniform to introduce different phase delays to different portions of the spectrally-spread beam 202. In this way, the phase modulator 204 may include a one or two-dimensional array of pixels suitable for providing individually-addressable phase modifications. Further, a two-dimensional array of pixels may be configured to provide any 1D or 2D phase modulation profile.

Figure 3:
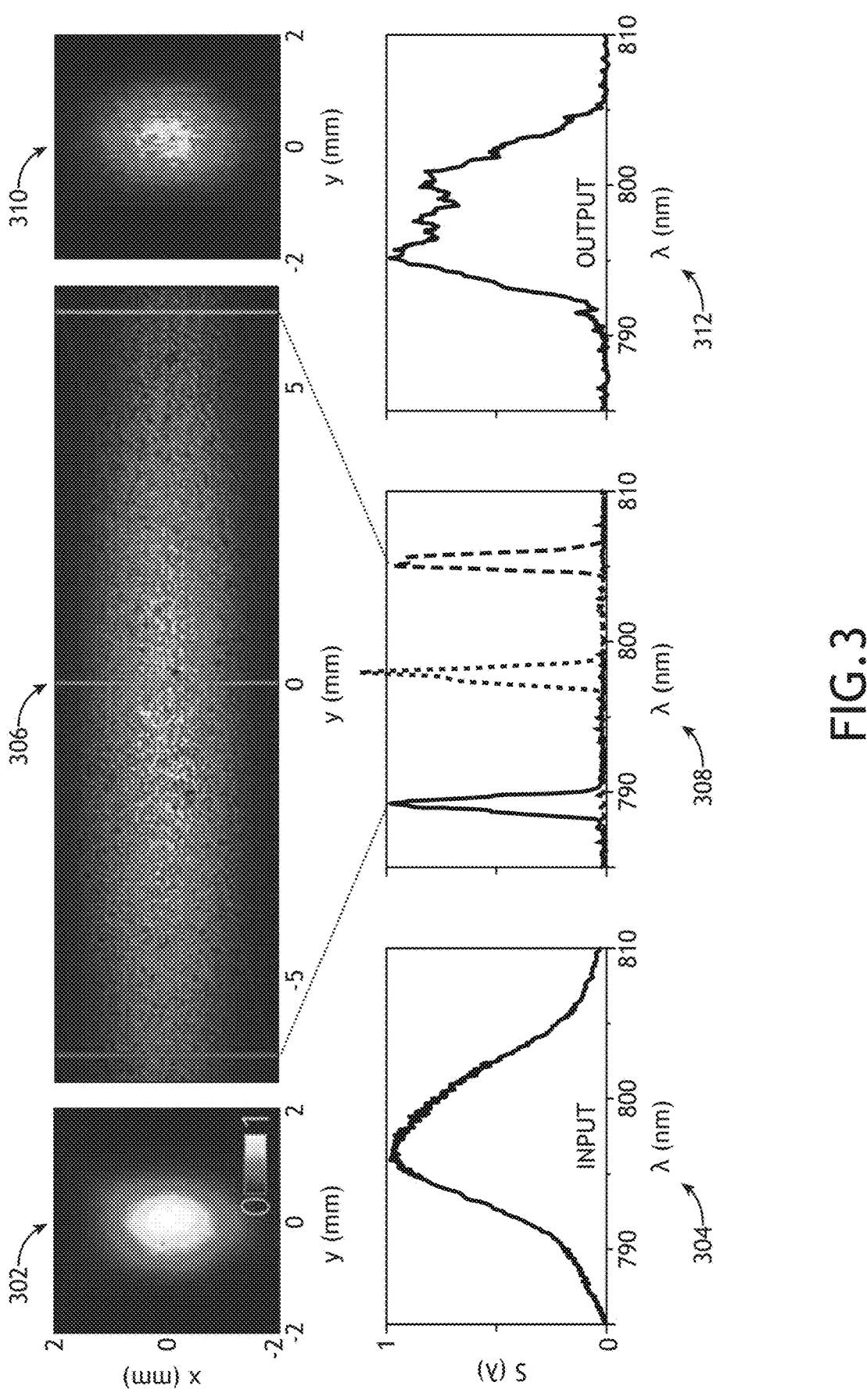
FIG. 3 is a series of plots depicting spectral stretching and compression by a pair of r-VBGs in a spectral phase modulator, in accordance with one or more embodiments of the present disclosure.
Figure 4A:
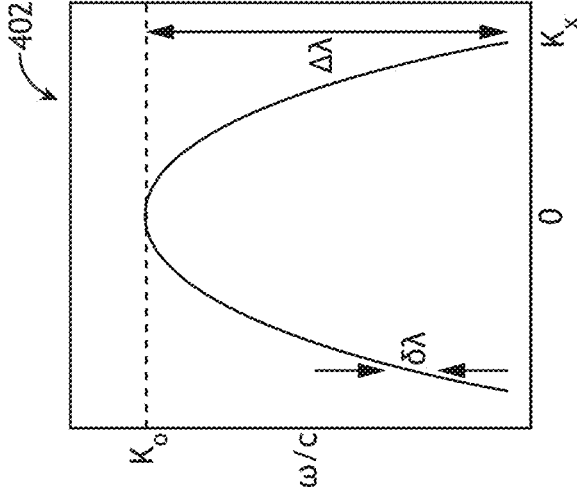
FIG. 4A is a representation of the spatiotemporal spectrum of a space-time wave packet (STWP) on the surface of the light-cone at its intersection with a tilted spectral plane, in accordance with one or more embodiments of the present disclosure.
Figure 4A:
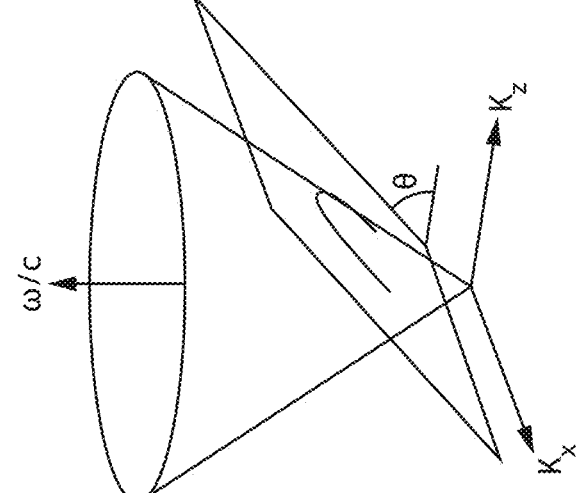
Figure 4B:
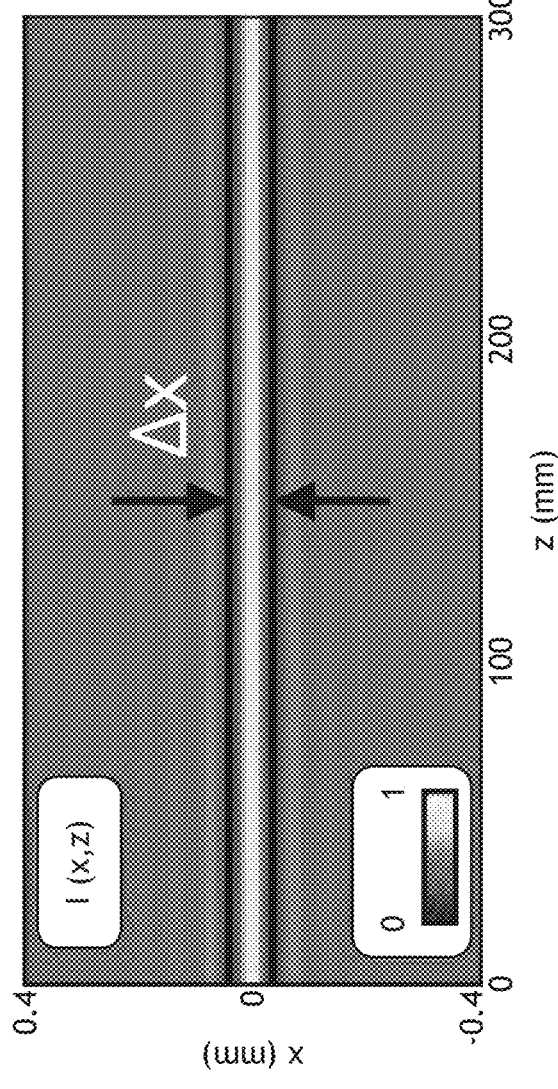
FIG. 4B is a plot of a time-averaged axial intensity profile of an STWP, in accordance with one or more embodiments of the present disclosure.
Figure 4C:
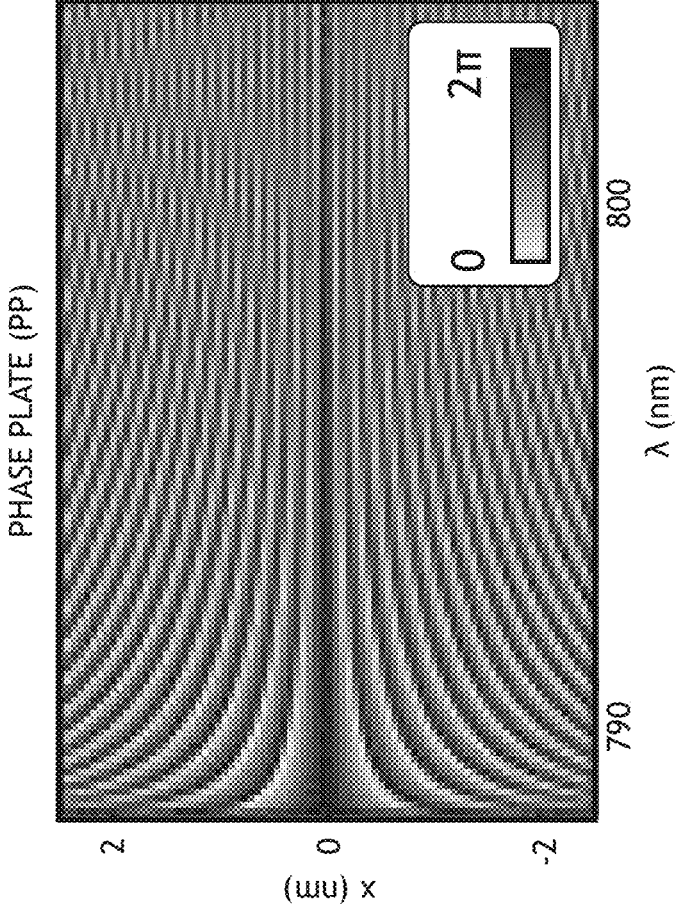
FIG. 4C is a plot of a two-dimensional phase profile that may be implemented by the phase modulator to generate one class of STWPs associated with FIGS. 4A-4B, in accordance with one or more embodiments of the present disclosure.

Referring now to FIGS. 3-4C, various experimental results are described in greater detail, in accordance with one or more embodiments of the present disclosure.

FIG. 3 is a series of plots depicting spectral stretching and compression by a pair of r-VBGs 100 in a spectral phase modulator 200, in accordance with one or more embodiments of the present disclosure. Plot 302 depicts a spatial profile of input light 108. Plot 304 depicts a spectrum of the input light 108. Plot 306 depicts a spatial profile of the spectrally-spread beam 202. Plot 308 depicts a spectrum of spectrally-spread beam 202 as measured in three spatial locations indicated in the Plot 306. Plot 310 depicts a spatial profile of the output beam 206. Plot 312 depicts a spectrum of the output beam 206. As depicted throughout the plots in FIG. 3, a pair of r-VBGs 100 may both stretch and compress the spectrum of the input light 108. It is noted that the minor spectral degradation shown in plot 312 may be due to variations in the manufacturing process or alignment of the second r-VBG 100-2 with the first r-VBG 100-1 and do not imply limitations on the present disclosure.

Referring now to FIGS. 4A-4B, the generation of STWPs are described in greater detail, in accordance with one or more embodiments of the present disclosure. In some embodiments, phase modulator 204 provides a phase modulation distribution to the spectrally-spread beam 202 configured to provide that the output beam 206 is a STWP.

A key feature of an STWP is that a particular form of angular dispersion (e.g., a wavelength-dependent propagation angle $\phi(\omega)$) is introduced into a generic plane wave pulse such that the axial wavenumber $k_z$ and temporal frequency are related by a specified relationship. One non-limiting example is a linear relationship such as a linear relationship $\Omega=(k_z-k_0)c\tan\theta$ in free space, where $\Omega=\omega-\omega_0$, $\omega_0$ is a fixed frequency associated with on-axis propagation, c is the speed of light in vacuum, $k_0=\omega_0/c$, and $\theta$ is a spectral tilt angle. Other examples may include nonlinear and/or non-one-to-one relationships between the axial wavenumber $k_z$ and $\omega$, that lead to various pulse propagation characteristics, such as dispersive propagation in free space, accelerating and decelerating pulses and spectral recycling of the field.

One non-limiting example is when the spatial modulation is limited to only one transverse coordinate x and hold the field uniform along y, then the spatiotemporal spectrum of the STWP is the conic section at the intersection of the light-cone $$k_x^2 + k_z^2 = \left(\frac{\omega}{c}\right)^2$$

with a plane that is parallel to the $k_x$ axis and makes an angle $\theta$ with the $k_z$ axis, where $k_x$ is the transverse wavenumber along x. FIG. 4A is a representation of the spatiotemporal spectrum of an STWP on the surface of the light-cone at its intersection with a tilted spectral plane, in accordance with one or more embodiments of the present disclosure. The inset 402 depicts that the spectral projection onto the $$\left(k_x, \frac{\omega}{c}\right)$$

domain is a conic section.

The STWP field $E(x, z; t)=e^{i(k_0 z - \omega_0 t)}\psi(x,z;t)$ may then have a propagation invariant envelope $\psi(x, z;t)=\psi(x, 0; t-z/\tilde{v})$ that travels rigidly in free space at a group velocity $\tilde{v}=c \tan \theta$ determined solely by the spectral tilt angle $\theta$. The time-averaged intensity $I(x, z)=\int dt |E(x, z; t)|^2=I(x, 0)$ is independent of z. FIG. 4B is a plot of a time-averaged axial intensity profile $I(x, z)$ of an STWP (e.g., an output beam 206), in accordance with one or more embodiments of the present disclosure. In particular, FIG. 4B describes a particular non-limiting configuration of $\theta=44.97°$ and beam size $\Delta x \approx 40$ μm (e.g., of the input light 108).

FIG. 4C is a plot of a two-dimensional phase profile that may be implemented by the phase modulator 204 to generate one class of STWPs (e.g., in the output beam 206) associated with FIGS. 4A-4B, in accordance with one or more embodiments of the present disclosure.

It is contemplated herein that synthesizing such an STWP requires an arrangement that: (1) spatially resolves the spectrum of a generic light source (e.g., input light 108, which may be coherent or incoherent); (2) modulates the spatial distribution of each frequency $\omega$ to associate with it the requisite spatial frequency $k_x(\omega)$ or range of spatial frequencies $\Delta k_x(\omega)$; before (3) recombining the spectrum to reconstitute the spectrally resolved field (e.g., the output beam 206). It is further contemplated herein that the spectral phase modulator 200 as disclosed herein may have substantially less volume than a traditional system (e.g., half the volume or less).

Referring generally to FIG. 4A-4C, it is to be understood that FIGS. 4A-4C and the associated description are provided solely for illustrative purposes and should not be interpreted as limiting the scope of the present disclosure. For example, the phase modulator 204 may implement any phase modulation profile suitable for generating a STWP with any desired properties.

In some embodiments, the output beam 206 has a frequency-dependent propagation angle such that an axial wavenumber $k_z$ and temporal frequency $\omega$ are related by a non-linear relationship in free space (e.g., a quadratic, cubic, a polynomial relationship, or the like). In some embodiments, the output beam 206 has a frequency-dependent propagation angle $\phi(\omega)$, where at least one such that at least one axial wavenumber $k_z$ is correlated with multiple frequencies $\omega$.

More generally, the phase modulator 204 may introduce any one-dimensional or two-dimensional phase modulation profile suitable for any intended application.

As another illustration, the spectral phase modulator 200 may be configured to pre-chirp an ultrashort laser pulse. For example, an ultrashort laser pulse may exhibit pulse broadening as it propagates due to differences in propagation speed of different wavelengths. However, it may be desirable in some applications to provide an ultrashort pulse on a target, where the pulse duration is minimized (e.g., as short as it can given its spectrum) at the target.

In some embodiments, the spectral phase modulator 200 is configured to introduce negative chirp to input light 108 including an ultrashort pulse such that an output beam 206 including the ultrashort pulse may have a minimized pulse duration after propagation a selected distance through a selected medium.

Referring again to FIG. 2, various additional aspects of the spectral phase modulator 200 are described in greater detail, in accordance with one or more embodiments of the present disclosure.

The controller 208 may be communicatively coupled to any component of the spectral phase modulator 200 and/or any external systems. In this way, the controller 208 may receive data from and/or direct (e.g., via control signals) any of the components of the spectral phase modulator 200 such as, but not limited to, the phase modulator 204. Further, the program instructions may cause the processors 210 to execute various actions or process steps as disclosed herein. For example, the controller 208 may provide a phase modulation profile to the phase modulator 204 or otherwise control a phase modulation profile provided by the phase modulator 204.

The one or more processors 210 of a controller 208 may include any processor or processing element known in the art. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FP-GAs), or one or more digital signal processors (DSPs)). In this sense, the one or more processors 210 may include any device configured to execute algorithms and/or instructions (e.g., program instructions stored in memory). In one embodiment, the one or more processors 210 may be embodied as a desktop computer, mainframe computer system, workstation, image computer, parallel processor, networked computer, or any other computer system configured to execute a program configured to operate or operate in conjunction with the spectral phase modulator 200, as described throughout the present disclosure Moreover, different components of the spectral phase modulator 200 may include a processor or logic elements suitable for carrying out at least a portion of the steps described in the present disclosure. Therefore, the above description should not be interpreted as a limitation on the embodiments of the present disclosure but merely as an illustration. Further, the steps described throughout the present disclosure may be carried out by a single controller or, alternatively, multiple controllers. Additionally, the controller 208 may be formed as one or more controllers housed in a common housing or within multiple housings. In this way, any controller or combination of controllers may be separately packaged as a module suitable for integration into the spectral phase modulator 200.

The memory 212 may include any storage medium known in the art suitable for storing program instructions executable by the associated one or more processors 210. For example, the memory 212 may include a non-transitory memory medium. By way of another example, the memory 212 may include, but is not limited to, a read-only memory (ROM), a random-access memory (RAM), a magnetic or optical memory device (e.g., disk), a magnetic tape, a solid-state drive and the like. It is further noted that memory 212 may be housed in a common controller housing with the one or more processors 210. In one embodiment, the memory 212 may be located remotely with respect to the physical location of the one or more processors 210 and controller 208. For instance, the one or more processors 210 of controller 208 may access a remote memory (e.g., server), accessible through a network (e.g., internet, intranet and the like).

The user interface 214 may include any component or combination of components known in the art suitable for providing information to a user and/or receiving inputs from a user. For example, the user interface 214 may include, but is not limited to, one or more desktops, laptops, tablets, and the like. In embodiments, the user interface 214 includes a display used to display data to a user. The display of the user interface 214 may include any display known in the art. For example, the display may include, but is not limited to, a liquid crystal display (LCD), an organic light-emitting diode (OLED) based display, or a CRT display. Those skilled in the art should recognize that any display device capable of integration with a user interface 214 is suitable for implementation in the present disclosure. In embodiments, a user may input selections and/or instructions responsive to data displayed to the user via a user input device of the user interface 214 such as, but not limited to, a keyboard, a mouse, a touchscreen, or an audio interface (e.g., a voice interface suitable for accepting audio commands from a user).

Referring now to FIG. 5, FIG. 5 is a flow diagram illustrating steps performed in a method 500 for spectral phase modulation using a pair of chirped r-VBGs 100, in accordance with one or more embodiments of the present disclosure. Applicant notes that the embodiments and enabling technologies described previously herein in the context of the spectral phase modulator 200 should be interpreted to extend to the method 500. It is further noted, however, that the method 500 is not limited to the architecture of the spectral phase modulator 200.

In some embodiments, the method 500 includes a step 502 of reflecting, with a first r-VBG 100-1, portions of an input beam (e.g., input light 108) propagating along an incidence direction 106 satisfying a Bragg condition as a spectrally-spread beam 202 propagating along a separation direction 216, where the Bragg condition is satisfied for different wavelengths at different locations of the first r-VBG 100-1 along the incidence direction 106 to provide that a spectrum of the spectrally-spread beam 202 is dispersed along the incidence direction 106.

In some embodiments, the method 500 includes a step 504 of applying, with a phase modulator 204, a spatially non-uniform phase distribution to the spectrally-spread beam 202. Any one-dimensional or two-dimensional phase distribution is within the spirit and scope of the present disclosure.

In some embodiments, the method 500 includes a step 506 of reflecting, with a second r-VBG 100-2, portions of the spectrally-spread beam 202 satisfying the Bragg condition as an output beam 206, where the second r-VBG 100-2 is positioned to provide that the Bragg condition is satisfied for different wavelengths at different locations along the incidence direction 106 to provide that the spectrally-spread beam 202 is spectrally recombined into an output beam 206.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A device comprising:

two rotated volume Bragg gratings (r-VBGs) formed as planes of refractive index variation with periodicity along parallel grating vectors, wherein periods of the two r-VBGs are chirped along the respective grating vectors to vary along the respective grating vectors, wherein the two r-VBGs are spatially separated along a separation direction oriented at a nonzero angle relative to the grating vectors; and a phase modulator between the two r-VBGs with a spatially non-uniform phase distribution in a plane orthogonal to the separation direction;

wherein a first of the two r-VBGs is configured to reflect portions of an input beam propagating along an incidence direction satisfying a Bragg condition into the separation direction towards the phase modulator as spectrally-spread beam, wherein the Bragg condition is satisfied for different wavelengths at different locations of the first r-VBG along the incidence direction to provide that a spectrum of the spectrally-spread beam is dispersed along the incidence direction; and wherein a second of the two r-VBGs is configured to reflect portions of the spectrally-spread beam satisfying the Bragg condition into the incidence direction, wherein the second r-VBG is positioned to provide that the Bragg condition is satisfied for different wavelengths at different locations of the first r-VBG along the incidence direction to provide that the spectrally-spread beam is spectrally recombined into an output beam.

2. The device of claim 1, wherein the nonzero angle is 45 degrees.

3. The device of claim 1, wherein the first r-VBG is formed in a first material, wherein the second r-VBG is formed in a second material, wherein the phase modulator is located between the first and second r-VBGs without intervening components.

4. The device of claim 1, wherein the phase modulator is in physical contact with at least one of the first or second r-VBGs.

5. The device of claim 1, wherein the two r-VBGs and the phase modulator are formed in a single material.

6. The device of claim 1, wherein the phase modulator is a two-dimensional phase modulator.

7. The device of claim 1, wherein the phase modulator is a one-dimensional phase modulator.

8. The device of claim 1, wherein the spatially non-uniform phase distribution of the phase modulator is selected to transform the input beam into a space-time wave packet (STWP).

9. The device of claim 8, wherein the output beam has a frequency-dependent propagation angle $\phi(\omega)$ such that an axial wavenumber $k_z$ and temporal frequency $\omega$ are related by a linear relationship $\Omega=(k_z-k_0)c \cdot \tan \theta$ in free space, where $\Omega=\omega-\omega_0$, $\omega_0$ is a fixed frequency associated with on-axis propagation, c is the speed of light in vacuum, $k_0=\omega_0/c$, $\theta$ is spectral angle, and z is the incidence direction.

10. The device of claim 8, wherein the output beam has a frequency-dependent propagation angle such that an axial wavenumber $k_z$ and temporal frequency $\omega$ are related by a non-linear relationship in free space.

11. The device of claim 10, wherein the non-linear relationship in free space comprises:

at least one of a quadratic, cubic, or polynomial relationship.

12. The device of claim 8, wherein the output beam has a frequency-dependent propagation angle $\phi(\omega)$, wherein at least one such that at least one axial wavenumber $k_z$ is correlated with multiple frequencies $\omega$.

13. The device of claim 1, wherein the input beam is a laser pulse, wherein the spatially non-uniform phase distribution of the phase modulator is selected to apply negative chirp to the laser pulse.

14. A method comprising:

reflecting, with a first rotated volume Bragg grating (r-VBG), portions of an input beam propagating along an incidence direction satisfying a Bragg condition as a spectrally-spread beam propagating along a separation direction, wherein the Bragg condition is satisfied for different wavelengths at different locations of the first r-VBG along the incidence direction to provide that a spectrum of the spectrally-spread beam is dispersed along the incidence direction;

applying, with a phase modulator, a spatially non-uniform phase distribution to the spectrally-spread beam; and reflecting, with a second r-VBG, portions of the spectrally-spread beam satisfying the Bragg condition as an output beam, wherein the second r-VBG is positioned to provide that the Bragg condition is satisfied for different wavelengths at different locations of the first r-VBG along the incidence direction to provide that the spectrally-spread beam is spectrally recombined into an output beam propagating along the incidence direction;

wherein the first and second r-VBGs are formed as planes of refractive index variation with periodicity along parallel grating vectors, wherein periods of the first and second r-VBGs are chirped along the respective grating vectors to vary along the respective grating vectors, wherein the first and second r-VBGs are spatially separated along the separation direction oriented at a nonzero angle relative to the grating vectors.

15. The method of claim 14, wherein the nonzero angle is 45 degrees.

16. The method of claim 14, wherein the first r-VBG is formed in a first material, wherein the second r-VBG is formed in a second material, wherein the phase modulator is located between the first and second r-VBGs without intervening components.

17. The method of claim 14, wherein the phase modulator is in physical contact with at least one of the first or second r-VBGs.

18. The method of claim 14, wherein the first r-VBG, the second r-VBG, and the phase modulator are formed in a single material.

19. The method of claim 14, wherein the phase modulator is a two-dimensional phase modulator.

20. The method of claim 14, wherein the phase modulator is a one-dimensional phase modulator.

21. The method of claim 14, wherein the spatially non-uniform phase distribution of the phase modulator is selected to transform the input beam into a space-time wave packet (STWP).

22. The method of claim 21, wherein the output beam has a frequency-dependent propagation angle $\phi(\omega)$ such that an axial wavenumber $k_z$ and temporal frequency @ are related by a linear relationship $\Omega=(k_z-k_0)c \cdot \tan \theta$ in free space, where $\Omega=\omega-\omega_0$, $\omega_0$ is a fixed frequency associated with on-axis propagation, c is the speed of light in vacuum, $k_0=\omega_0/c$, $\theta$ is spectral angle, and z is the incidence direction.

23. The method of claim 14, wherein the output beam has a frequency-dependent propagation angle such that an axial wavenumber $k_z$ and temporal frequency $\omega$ are related by a non-linear relationship in free space.

24. The method of claim 23, wherein the non-linear relationship in free space comprises:

at least one of a quadratic, cubic, or polynomial relationship.

25. The method of claim 14, wherein the output beam has a frequency-dependent propagation angle $\phi(\omega)$, wherein at least one such that at least one axial wavenumber $k_z$ is correlated with multiple frequencies $\omega$.

26. The method of claim 14, wherein the input light is a laser pulse, wherein the spatially non-uniform phase distribution of the phase modulator is selected to apply negative chirp to the laser pulse.

\* \* \* \* \*